United States Patent [19]

Oxaal et al.

[11] Patent Number: 5,546,807
[45] Date of Patent: Aug. 20, 1996

[54] HIGH SPEED VOLUMETRIC ULTRASOUND IMAGING SYSTEM

[76] Inventors: John T. Oxaal, c/o 3D Ultrasound Inc. 302 E. Pettigrew #307, Durham, N.C. 27503; Olaf T. Van Ramm, 4718 Harmony Ch Rd., Efzand, N.C. 27243; David M. Blaker, 1617 Bellechase Rd, Hillsborough, N.C. 27278-9210; Robert S. Smith, 1263 Emory St., San Jose, Calif. 95126

[21] Appl. No.: 306,716

[22] Filed: Dec. 2, 1994

[51] Int. Cl.$^6$ .................................................. G01N 29/06
[52] U.S. Cl. .................. 73/606; 73/602; 73/625
[58] Field of Search .................. 73/602, 606, 621, 73/625, 628; 367/7, 11; 364/413.25; 12 B/660.01, 660.04, 660.05, 661.01

[56] References Cited

U.S. PATENT DOCUMENTS

| | | | |
|---|---|---|---|
| 4,596,145 | 6/1986 | Smith et al. | 73/626 |
| 4,694,434 | 9/1987 | von Ramm et al. | 367/7 |
| 5,142,649 | 8/1992 | O'Donnell | 367/7 |

OTHER PUBLICATIONS

Improved Real Time Volumetric Ultrasonic Imaging System–Pavy, Smith, von Ramm Proceedings–Int. Soc. for Optic Engineering, vol. 1443, pp. 54–61, 25–26 Feb. 1991.
Hi Speed Ultrasound Vol. Imaging System, Smith, von Ramm, Pavy IEEE Transactions Smith Pavy, von Ramm vol. 38, pp. 100–108, Mar. 1991.

Primary Examiner—Hezron E. Williams
Assistant Examiner—Christine K. Oda
Attorney, Agent, or Firm—Robert Samuel Smith

[57] ABSTRACT

A high speed method for presenting display of images obtained from a volumetric scanner in which multiple slices of object space are displayed simultaneously in real time thereby enabling a viewer to study relationships between various parts of the object. The slices are selectable by the viewer manipulating an icon on the display screen. Accordingly C-scans or B scans may be selected as well as I scans in which the scan plane has a selected orientation. Multiple I scans may be selected and viewed in perspective so that the viewer has an impression of a three dimensional display. Color and spectral doppler is incorporated with the scans to provide additional information of dynamic properties.

25 Claims, 13 Drawing Sheets

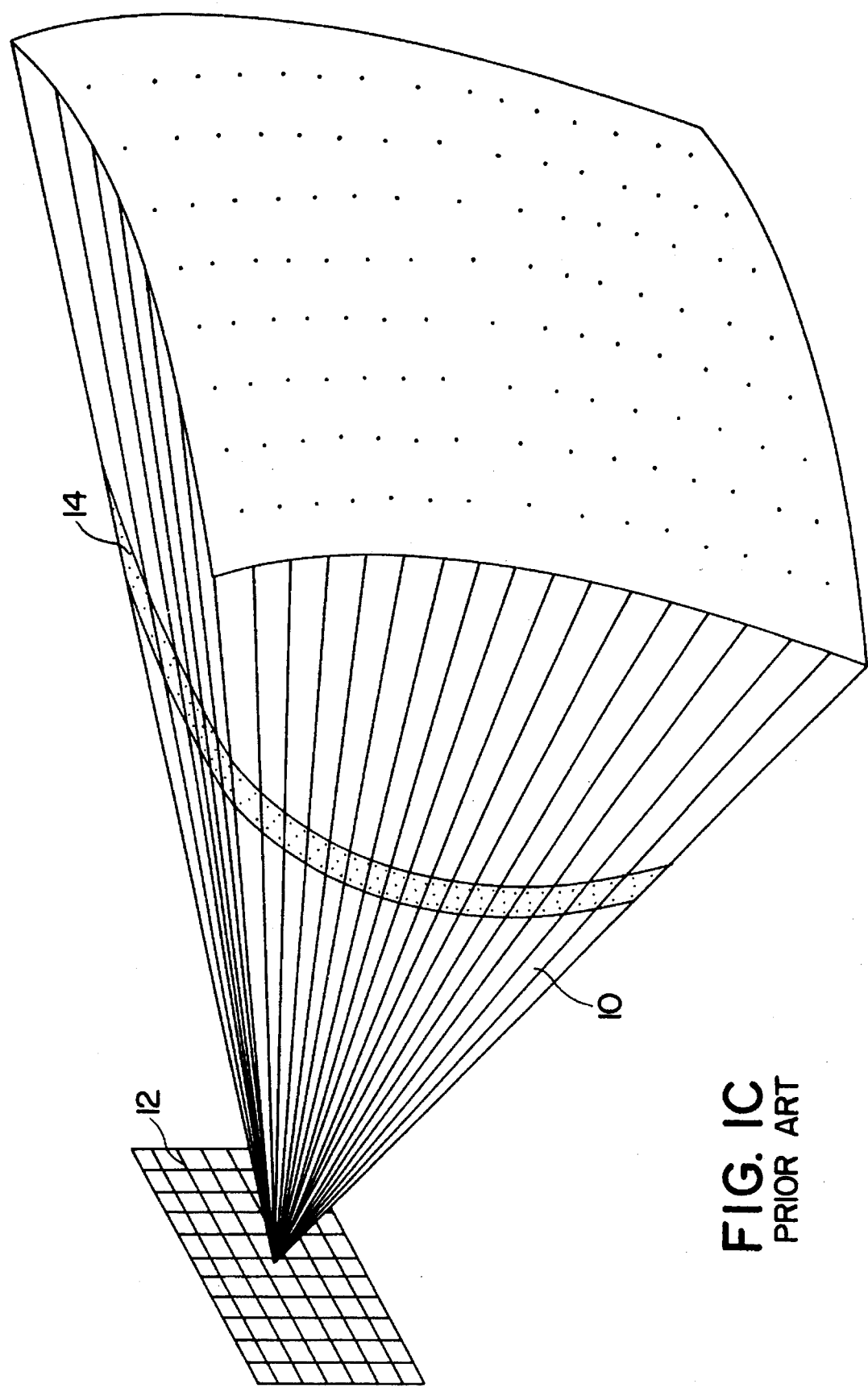
FIG. IC
PRIOR ART

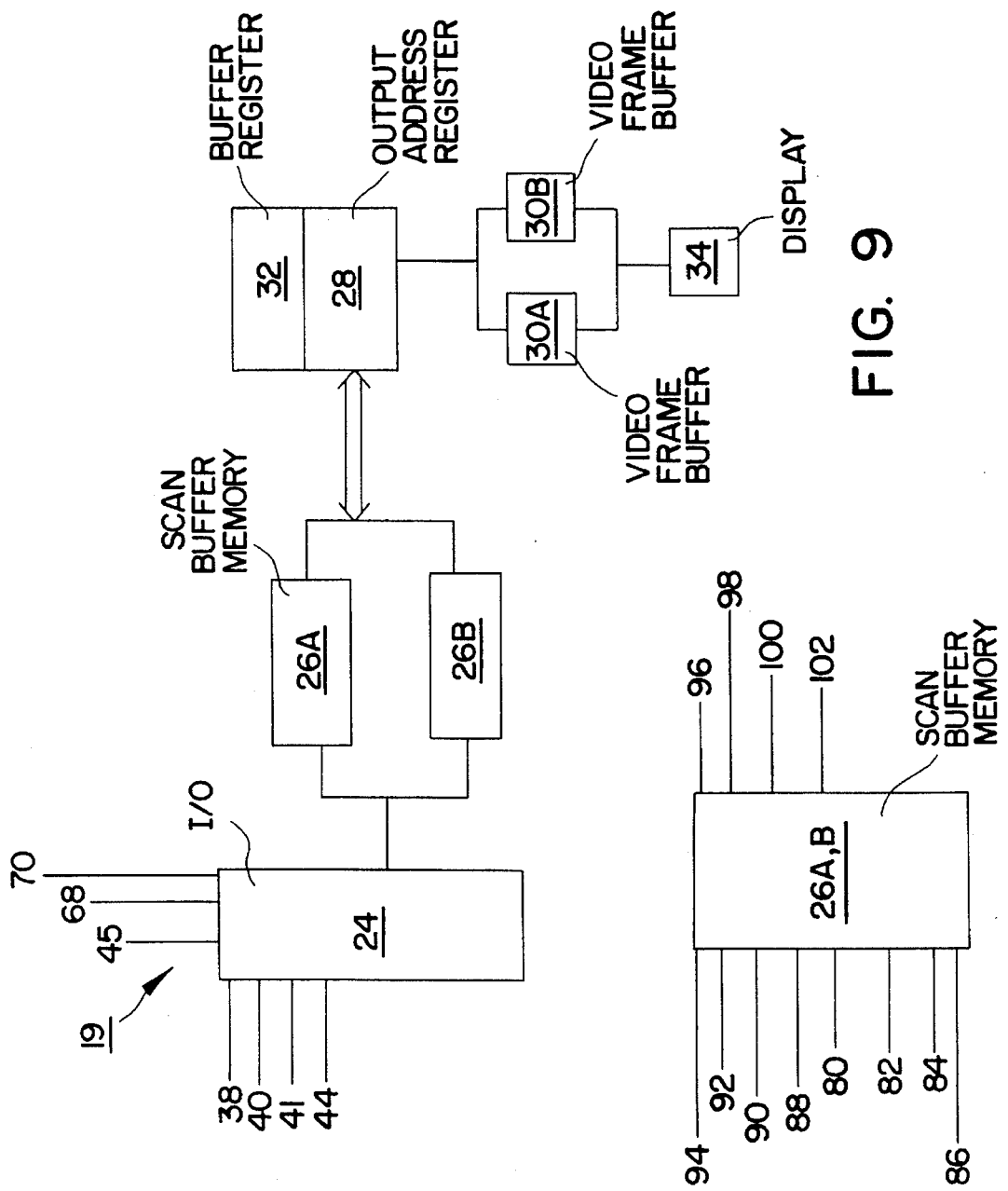

HIGH SPEED VOLUMETRIC ULTRASOUND IMAGING SYSTEM

FIELD OF THE INVENTION

This invention relates to improvements in ultrasound imaging and particularly to improvements in high speed, volumetric ultrasound imaging. This ultrasonic imaging system simultaneously displays a plurality of sectional views of a three dimensional object so as to provide the viewer with information regarding the relationship between parts of the object that is not otherwise available from single two dimensional view or a single three dimensional view.

PRIOR ART

High speed ultrasonic imaging has been extensively applied in virtually every medical specialty in the form of pulse echo B tomography B-mode tomography or B-scans systems display echoes returning to an ultrasonic transducer as brightness levels proportional to echo amplitude. The display of brightness levels results in cross sectional images of the object in the plane perpendicular to the transducer aperture. With present ultrasonic arrays, transmit focusing and receive mode dynamic focusing are achieved by proper timing of the transmit signals and delaying of the receive mode echoes. For example, a sectored linear phased array consists of a group of transducer elements which is not only focused but also steered over a single sector in transmit and receive (Tx and Rx) by properly timing the transmit signals and receive mode echoes.

Examination of objects in three dimension has evolved to a very sophisticated technology using a number of modalities. These modalities include x-ray, ultrasound, and nuclear magnetic resonance. Efforts to improve the technology have been made in the areas of greater spatial resolution, dynamic range (increase grey scale differentiation) improved display methods and data implementation methods. Ultrasound scanning of 3-D objects by sequential B-scans followed by off-line reconstruction and display of rendered images has progressed in recent years with the introduction of commercial 3-D systems. However, these systems require several minutes to produce a single 3-D scan.

In the area of high speed 3-D ultrasound imaging, U.S. Pat. No. 4,596,145 to Smith and von Ramm disclosed in 1986 an acoustic imaging system capable of producing a high speed projection orthoscopic image, as well as a single high speed C-scan image by using a two dimensional array transducer and receive mode parallel processing. The C-scan image was defined as a planar section of the object parallel to the effective transducer aperture. In 1987, U.S. Pat. No. 4,694,434, von Ramm and Smith disclosed a steered phase array acoustic imaging scanner capable of producing a high speed pyramidal scan (FIG. 1A) to obtain a volumetric (three dimensional) image by using a two dimensional array transducer and receive mode parallel processing. In receive mode parallel processing, a plurality of image lines is obtained for each transmit pulse. These two patents are incorporated by reference into this specification.

In 1991, in IEEE Transactions on Ultrasonic Ferroelectrics and Frequency Control, vol. 38, #2, March 1991, PP. 108–115 (incorporated by reference into this specification) von Ramm et al further described the pyramidal scan 10 of the volumetric scanner as shown in FIG. 1. The description included the geometry of the planar C-scan 14 parallel to the transducer face as illustrated in FIG. 1A, a C-scan 14B in the form of a concave spherical shell centered on the apex of the pyramidal scan as illustrated in FIG. 1B, a C-scan 14C in the form of a convex spherical shell centered at a selectable depth from the origin of the scan as illustrated by FIG. 1C. The paper also included a cartesian coordinate system as shown in FIG. 2.

In 1991, in SPIE Proceedings, v. 1443, Medical Imaging V: Image Physics, Pavy et al, described further details of the high speed ultrasound volumetric scanner including the concept of a simultaneous B-scan and a single interactive movable C-scan extracted from the pyramidal scan of the volumetric imaging system as illustrated in FIG. 1A. It should be noted that all these C-scan techniques relied on an analog range gate applied to the dedicated video echo systems instead of using a digital scan converter.

All of the foregoing display options are incomplete in conveying high speed information about a moving 3-d target volume such as the beating heart. The single high speed C-scan inadequately samples the object volume. The current invention which includes multiple selectable planes and surfaces from the pyramidal scan volume corrects these inadequacies.

Several other concepts in the prior art of medical ultrasound should be mentioned. Common features of high speed B-scan systems include steerable M-mode lines for motion tracking of moving structures, steerable spectral Doppler for measurement of blood flow velocity components along the direction of sound propagation and color flow Doppler for qualitative evolution of blood flow.

In addition, B-scanners include digital scan converters to change the echo data stored in digital memory into television format. The scan converter includes a frame buffer memory wherein each address is identified by u,v, the coordinates of the corresponding location on the display screen. When memory location u,v is addressed, the coordinate values u,v are transformed to a pointer vector in object space to the orthogonal coordinates x,y (see FIG. 2). the pointer vector is then expressed in circular polar coordinates R, $\Theta$. The pointer vector R, is used to address the each data memory thereby reading out echo data stored at address R,$\Theta$ and storing each data in the frame buffer memory having coordinates u,v corresponding to the display screen. The normalized intensity data values are used to generate the image on the display screen. The image on the display screen is refreshed typically every 1/30 sec. An example of such a scan converter is taught by Blaker et al in U.S. Pat. No. 4,581,636.

According to the present state of the art for B-mode scan conversion, the various operations performed on the plurality of data values depend on the distance from the array transducer to the target location. This is because each pixel corresponds to a constant area in object space. The area in object space which subtends the solid angle defined by the transmit beam is greater at greater distances from the array. Thus there is a plurality of object data points per image pixel close to the array and a plurality of pixels per data points distal from the array. Consequently, close to the array, a process known as "prefiltering" is used to select an echo value to represent all of the neighboring locations whereas, distal from the array, the data values are interpolated to estimate echo intensities between locations of data values. Various sampling techniques have been disclosed in the prior art including using the largest intensity value and using the mean value.

Another recent development in the prior art of medical ultrasound is the introduction of remote review stations to redisplay B-mode images which have been transformed from the ultrasound scanner and stored in digital memory or on an optical disk for future evaluations and measurements.

THE INVENTION

Objects

It is an object of this invention to present new high speed methods for the display of images obtained from the volumetric ultrasound scanner. It is another object to present at high speed a plurality of C-scan images that are simultaneously acquired and displayed views of cross sectional planes of the 3-D object showing the structural relation of the intersected parts that may be moving relative to one another.

It is another object to present at high speed a plurality of C-scan images combined with a plurality of B-scan images that are simultaneous views acquired and displayed.

It is another object to present a plurality of inclined scan planes (I-scans). Such inclined planes are not C-scans nor B-scans but rather are planes cut through the scan volume at an arbitrary angle.

It is another object to provide on-line selectable simultaneous M-Mode and plane selectable B-scans and C-scans and I-scans from the pyramidal scans.

It is another object that the selectable simultaneous M-mode and all display planes shall have selectable thicknesses so that the echo data integrated over the image plane thickness shall provide additional information.

It is another object to display a high speed image of an inner surface within the pramidal scan volume surrounding a selectable origin point P within the pyramidal scan volume and combined with a selectable thickness. The inner surface is determined by the first echo data encountered by the transmit beam radiating outward from the selectable origin P within the pyramidal volume. The display brightness can be modulated by the distance of the first echo to the point P.

It is another object to compensate for differences in spatial resolution between an imaged plane distal from the transducer and an imaged plane close to the transducer array that originate from the difference in areas of the two planes which subtend the solid angle of the reflected beam on each pixel of the display.

It is another object to eliminate the jagged or pixelated edges of the image.

It is another object to utilize a touch screen color display in the Host Control to distinguish user options and modes of operation into groups of colors for ease of use.

It is another object to incorporate calculation of areas and volumes and to permit easy and accurate determination of quantitative descriptors.

It is another object to increase the data acquisition rate and improve image quality of the volumetric scan by the application of transmit mode parallel processing as well as receive mode parallel processing.

It is another object to combine the use of color and spectral Doppler methods with three dimensional phased array imaging using parallel processing methods to enable the user to more clearly identify local flow rates with structural features of the heart.

It is another object to substantially reduce the size and power consumption of each receive channel.

It is another object to incorporate a distributed novel memory architecture that permits substantial increase in the number of channels in the volumetric scanner without increasing wiring and power requirements for controlling the sequence of delays in respective delay lines.

It is another object to overcome a problem associated with the mismatch of time required for a physician to examine a number of displays in order to select a mode of display that will best satisfy his needs compared to the shorter time required to actually collect the data from examination of the patient. This mismatch is undesirable for numerous reasons including strain on the patient and extra expense related to inefficient use of the physicians time and the ultra sound equipment.

It is another object that both Doppler and color flow Doppler techniques operate simultaneously with the display B-scans and C-scans and I-scans.

SUMMARY

This invention is directed toward a system for displaying on a monitor screen views, either one view at a time or multiple simultaneous views from arbitrary view directions of a plurality of slices (cross sections) through an object to be examined. The views are formed by orthogonally projecting points on the cross section onto a hypothetical plane which is located figuratively in object space but wherein coordinates u, v on the hypothetical plane are synonomous with coordinates u, v on the display screen. The operator selects both the location and orientation of the slice and the orientation of the hypothetical plane with respect to the slice. He can display a plurality of slices in perspective to one another. In perspective means a line in object space between a location on one slice and a location on the other plane is projected orthogonally onto the hypothetical plane. The arrangement enables the operator to gain a three dimensional sense of structural features and to study in real time relative motion of parts of the object on different slices. The planes can be displayed in a variety of ways including a stack of simultaneously acquired and displayed C scans, B scans or as a stack of "I" scans. An "I" scan is understood in the context of this specification to mean scan of a slice which has any orientation within the object volume.

In the context of this specification, "orthogonal projection" of a point in object space onto a hypothetical plane is understood to mean figuratively the act of locating an image of an object point at an intersection with the hypothetical plane of a line drawn perpendicularly through the hypothetical plane and through the object point.

The location of a point in the object may be expressed by a set of rectangular coordinates x,y,z or polar coordinates, $R,\theta,\emptyset$, in which the origin of x,y,z and R is in the center of the plane of the transducer array and the transducer plane is the equatorial plane of the elevational angle,$\emptyset$, and $\theta$ is the azimuthal angle about an axis orthogonal to the transducer plane and passing through the origin. Coordinates u,v on the hypothetical plane (which are also coordinates on the display screen) can both be expressed as a function of coordinates $R,\emptyset,\theta$ which are the coordinates in object space of a point whose projection on the hypothetical plane is located at u, v. When the view direction of the slice is perpendicular to the slice, then the hypothetical plane containing the u,v coordinates is parallel to the slice. As the view direction rotates away from being perpendicular to the slice, the projected width of the slice contracts until, when the slice is parallel to the view direction, the slice looks like a straight line. This rotation of the view direction is equivalent to modifying the coordinates u,v on the hypothetical plane to new coordinates u', v'.

In practice, the reflected ultrasound intensity at each location in the selected slice is projected electronicaly onto the display plane by storing the echo data first in an echo data memory having addresses corresponding to locations on the slice expressed in the coordinates R,∅,θ and then transforming the echo data into a frame buffer memory having addresses corresponding to the u,v coordinates of the display screen. The orientation and location of the B, C, or I scan planes are displayed simultaneously and in real time. This capability enables the operator to compare views and select the views that provide the most information for this study of the scanned object. The operator can display, for example, a "three dimensional" stack of C-scans simultaneously together with one or more B scans.

The apparatus of this invention includes a transducer consisting of a two dimensional array of piezo electric elements (or a linear array combined with a motorized mechanical scanner) producing echo signals from the object which are resolved by a beam former and stored by a host controller into the memory of a scan converter such that the memory contains a map of the echo data stored from various locations in the entire volume of the object. An output address generator of the scan converter selects the echo data and respective coordinates originating from the selected scanned object and displays the data as brightness levels to produce an image of the projected slice on a monitor screen. The operation with the address generator also involves modifying the displayed image corresponding to the selection of the viewing direction (tilting the hypothetical plane) as discussed above thereby giving the viewer a keener sense of interaction between the moving parts.

The slice are selected by the operator using a track ball or light pen to modify a pyramidal icon which is shown continually on the display screen. The track ball or light pen is also used to select the elevational and azimuthal coordinates of the projected direction of the view. The operator controlled select device is interfaced to the Host Digital Controller and Scan Converter.

In order to reduce the size and power consumption of each receive channel in the beam former a mixed signal delay chip and a novel signal processing architecture using an "application specific integrated circuit" (ASIC) featuring mixed signal capability (analog and digital) is incorporated into the receive channel. The circuit includes analog and digital processing hardware for performing phased array scanning and applies parallel receive mode processing techniques to accommodate the large volume of data that is necessary for real time volumetric scanning.

A further embodiment also provides remote "Review Stations", several of which may be used with a single real-time volumetric scanner. The real-time volumetric scanner includes the transducer array and an echo memory in which all of the echo data from a sequence of pyramidal scans is stored. The scanner also includes a disk memory drive so that stored echo data may be recorded on a removable disk. The disk is then transferred to the review station which includes a disk drive and a review screen. The review station also includes controls which enable the user to select from memory data related to the desired sectional views of the object being studied at a time and place remote from the patient. The review station feature also provides that any number of copies of disk may be forwarded to distally located review stations for review to enable operators to consult with one another.

In another embodiment, an operator controlled device (e.g., light pen or track ball) is used to select various regions of interest for closer examination while simultaneously displaying a scan of the entire object. Closer examination includes the use of Doppler to measure blood flow in the selected areas while simultaneously showing entire scans.

An additional embodiment is the presentation of a phased array image in any one of the selected imaging modes of a selected view of the subject while displaying on another area of the screen a magnified view of Doppler data of a smaller region of the selected area. This is accomplished by presenting "frozen" views of the scan which are updated, for example, every 0.2 sec.

Another embodiment incorporates in the digital scan converter means for normalizing the difference in spatial resolution between planes close to and planes distal from the transducer that arise from the distance between the areas which subtend the solid angle of the beam close to the transducer from areas subtending the same angle distal from the transducer.

BRIEF DESCRIPTION OF THE DRAWINGS

FIG. 1C shows a C-scan in the form of a convex spherical shell.

FIG. 9 shows components of the scan converter.

FIG. 10 shows connections of the scan converter from the I/O controller and to the output address generator.

DESCRIPTION OF A PREFERRED EMBODIMENT

Figure 1A:
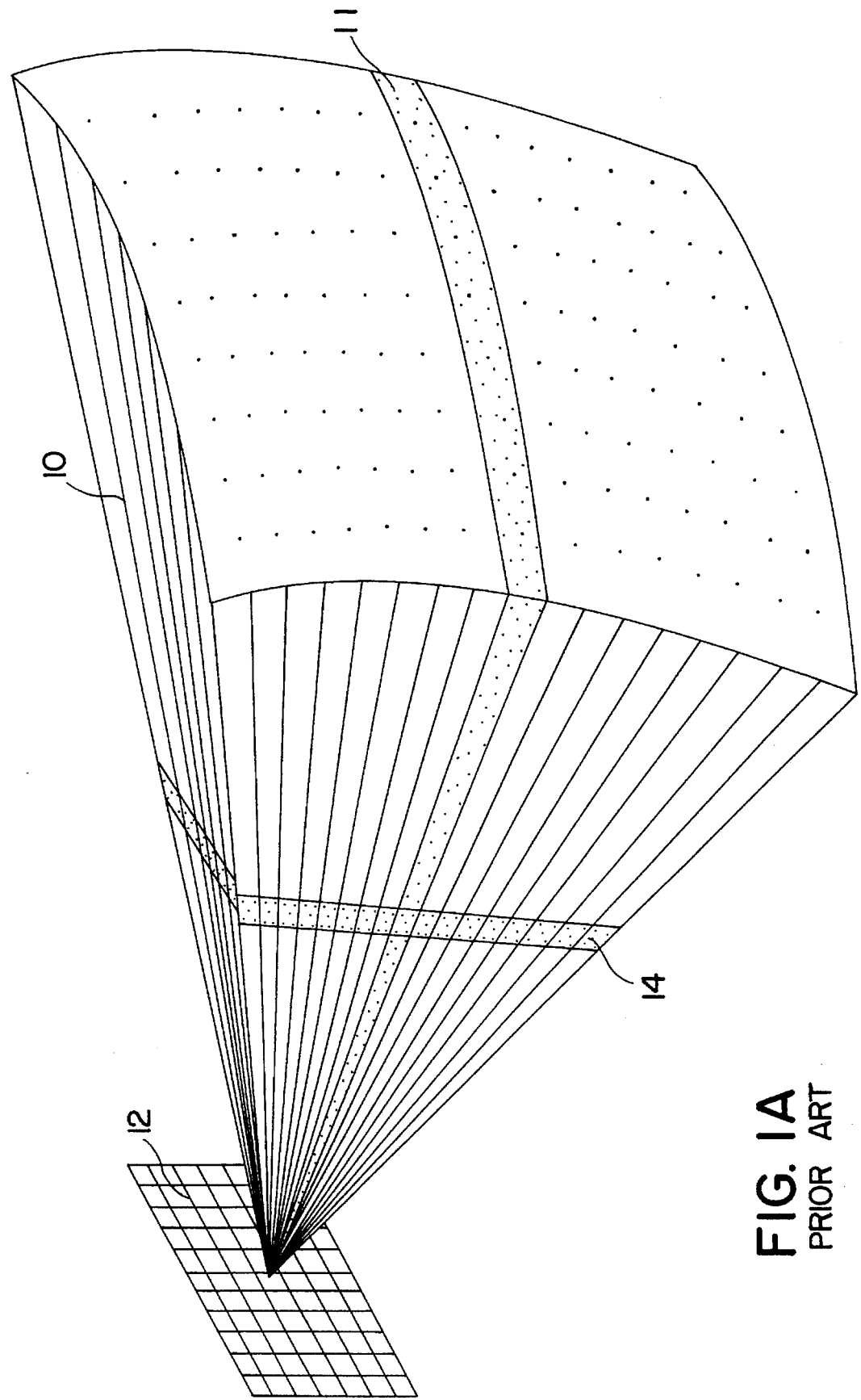
FIG. 1A shows a pyramidal scan with a C slice.
Figure 1B:
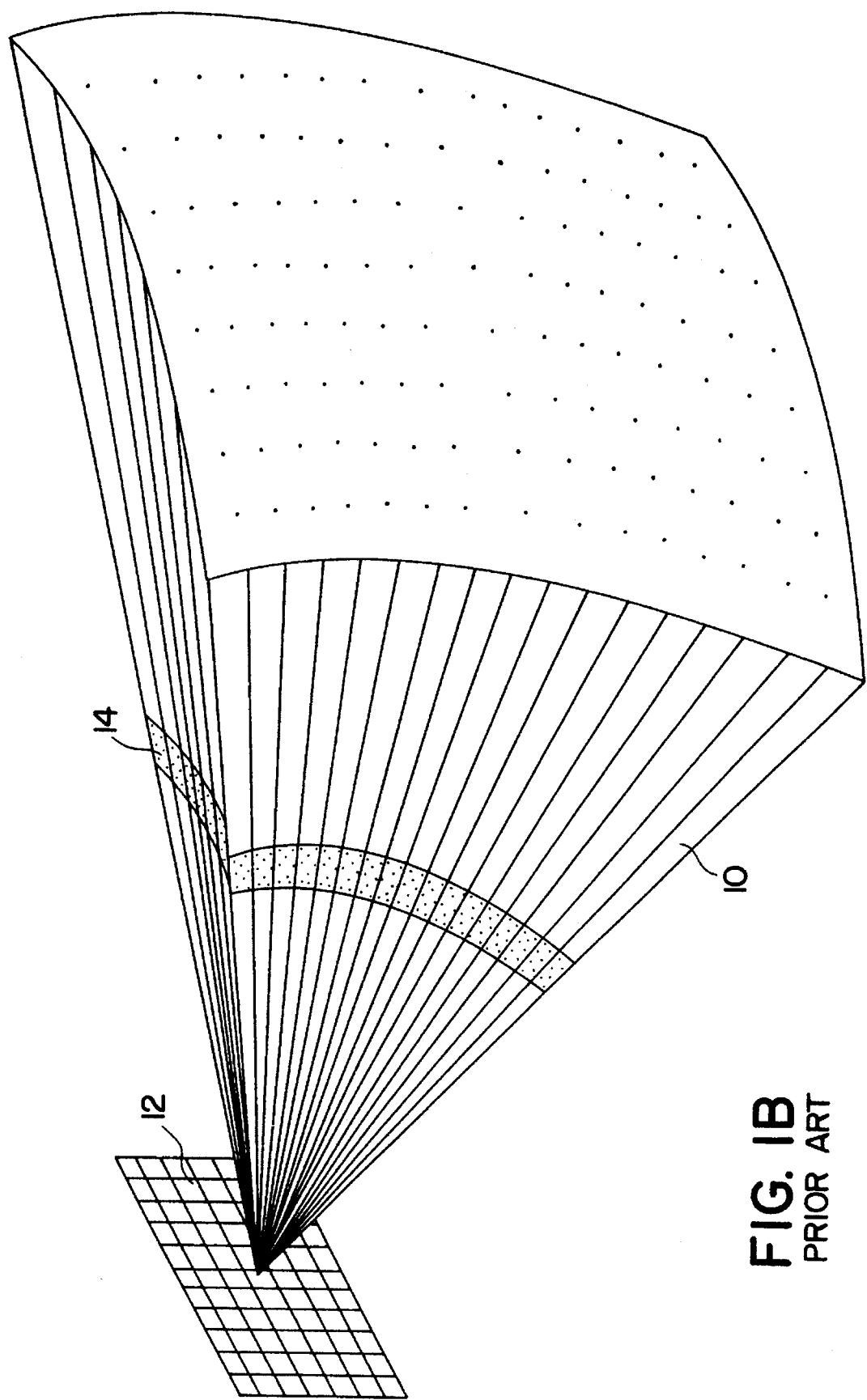
FIG. 1B shows a C scan in the form of a concave shell.
Figure 2:
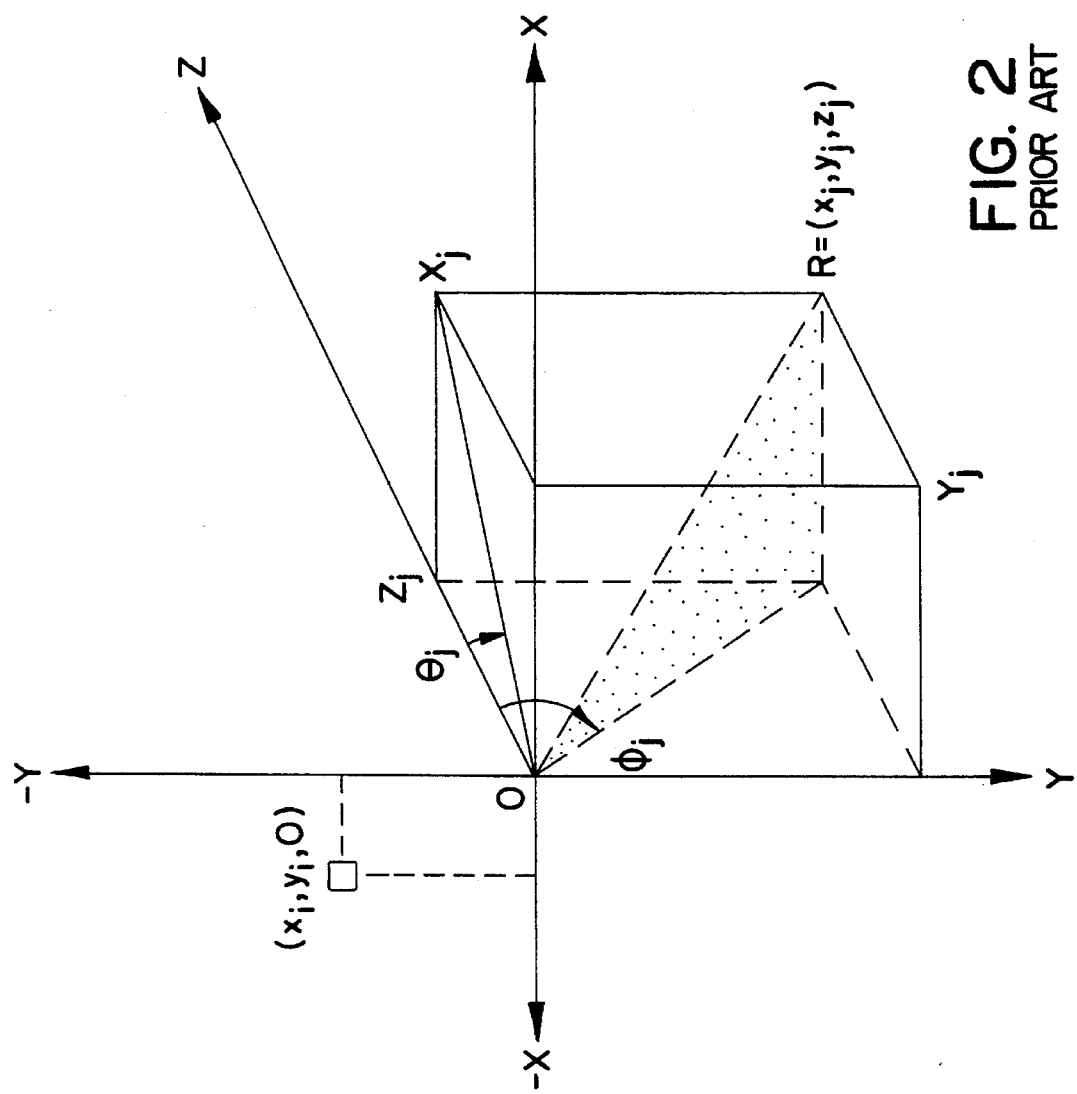
FIG. 2 shows the relation between rectangular coordinates and polar coordinates.
Figure 3A:
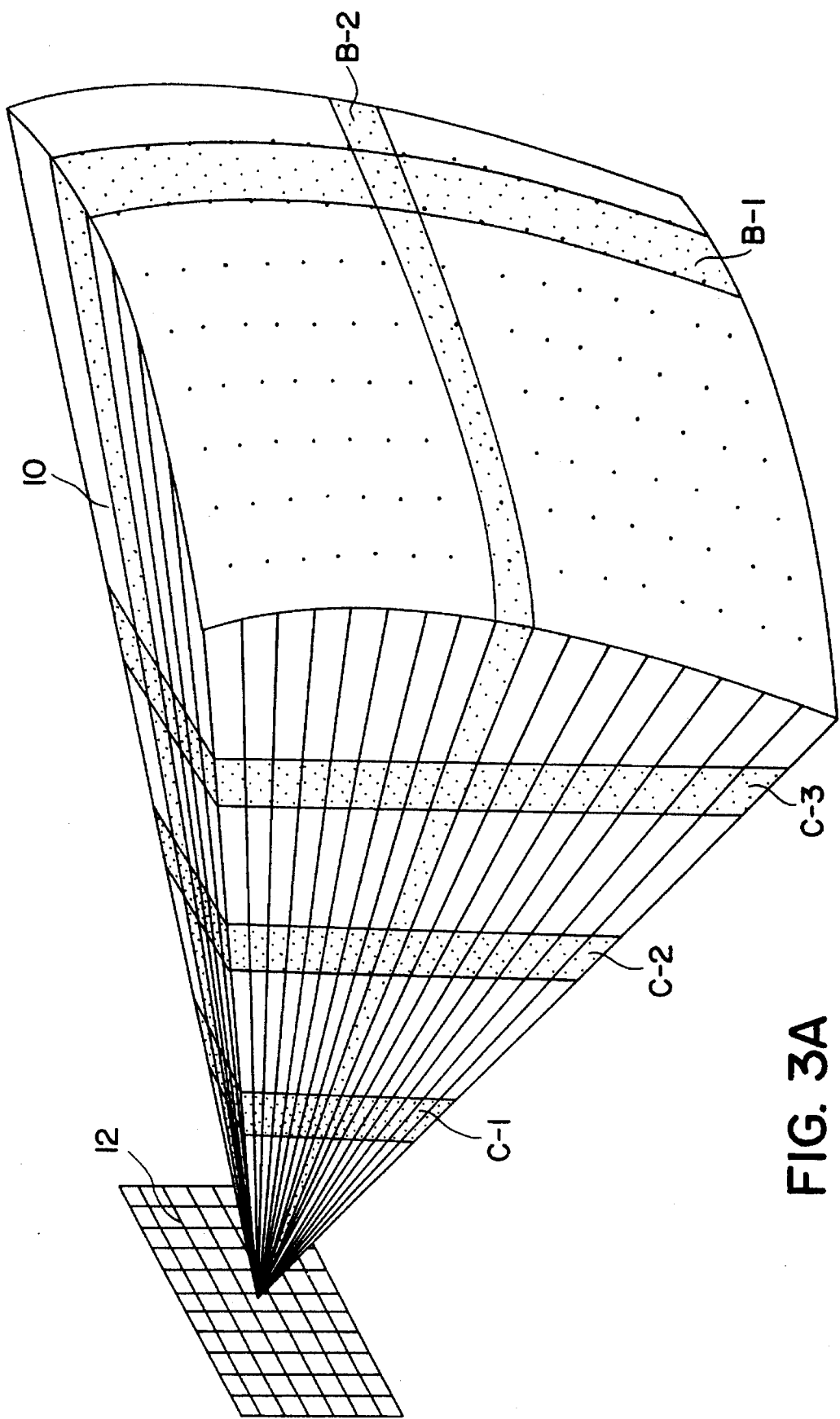
FIG. 3A shows multiple B and C slices.
Figure 3B:
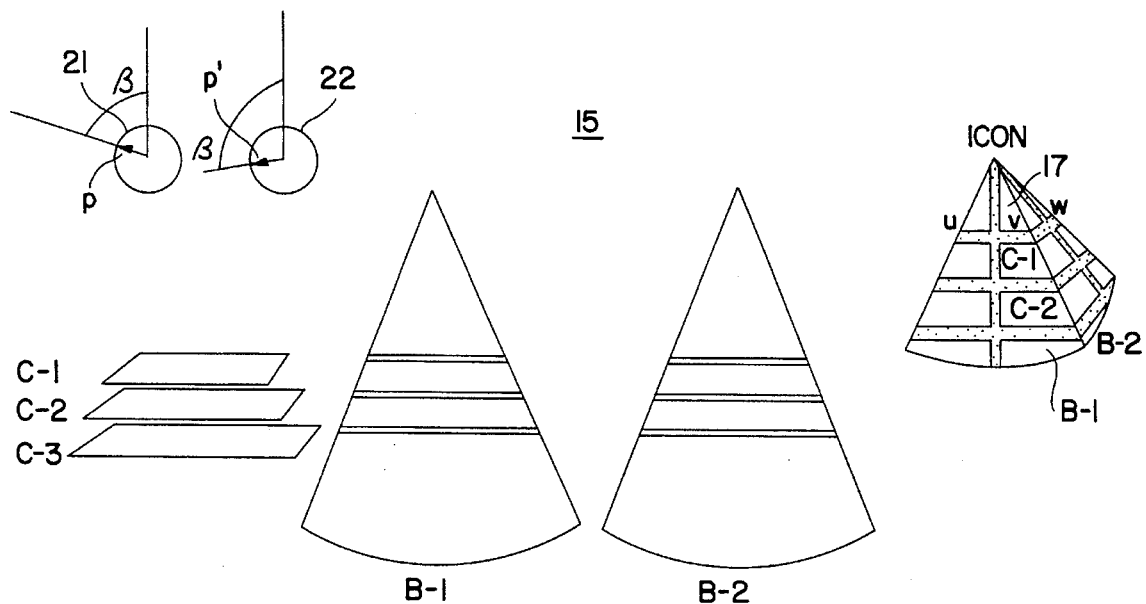
FIG. 3B shows scans and icons displayed on a monitor screen.

Turning now to a discussion of the figures, FIG. 3A shows five slices including three C-scans, (C1, C2, C3) and two B-scans (B1, B2) through the pyramidal volume 10 generated by array 12. FIG. 3B shows one object of the invention which is to display the slices (cross section) shown in FIG. 3A on a monitor screen 15 simultaneously in real time and in relation to one another as in the object. Only three C slices are shown but it may be understood that a larger number may be shown. The advantage of this display arrangement is that the physician can study the structural relations between various parts of a three dimensional object. If the object is moving and the cross sections are shown in real time, then the viewer can study the dynamic relation between the parts.

An icon 17 is also shown which is activated by a track ball to select the slices. The icon 17 is a pyramid with which parameters associated with the selection of the slice are positions along the edges of the pyramid.

Another pair of icons, 21 and 22 are used to select the view direction. Point P (FIG. 3B) is activated when it is desired to view the slice from one side. Point P' is activated when it is desired to view the slice from the opposite side. The distance from the center of the respective circle selects a value cos β where β is the angle that the view direction makes with the slice and the rotational position of P or P' marks the angular position of the view direction.

Figure 4:
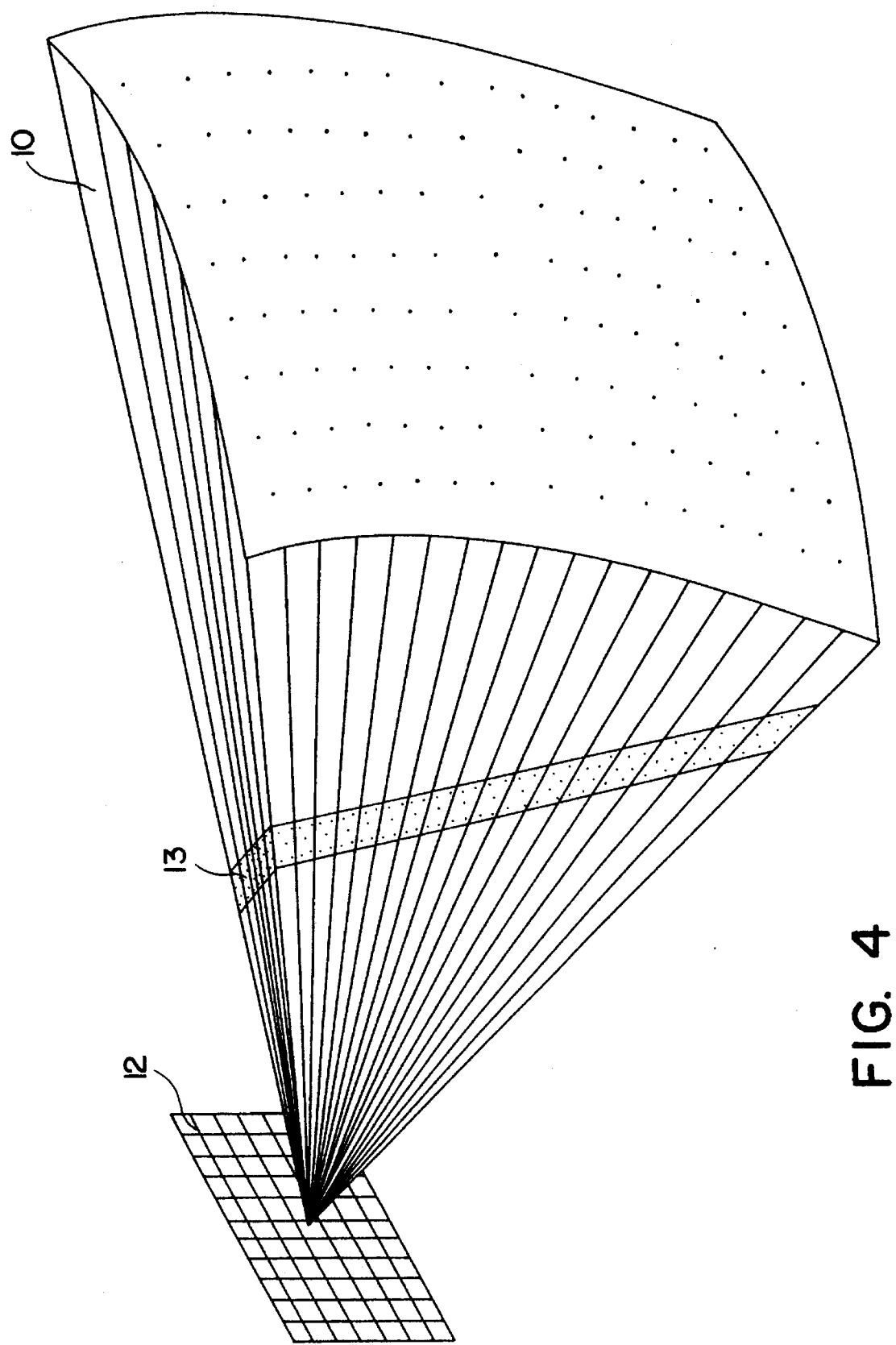
FIG. 4 shows an inclined slice for producing an I scan.
Figure 5:
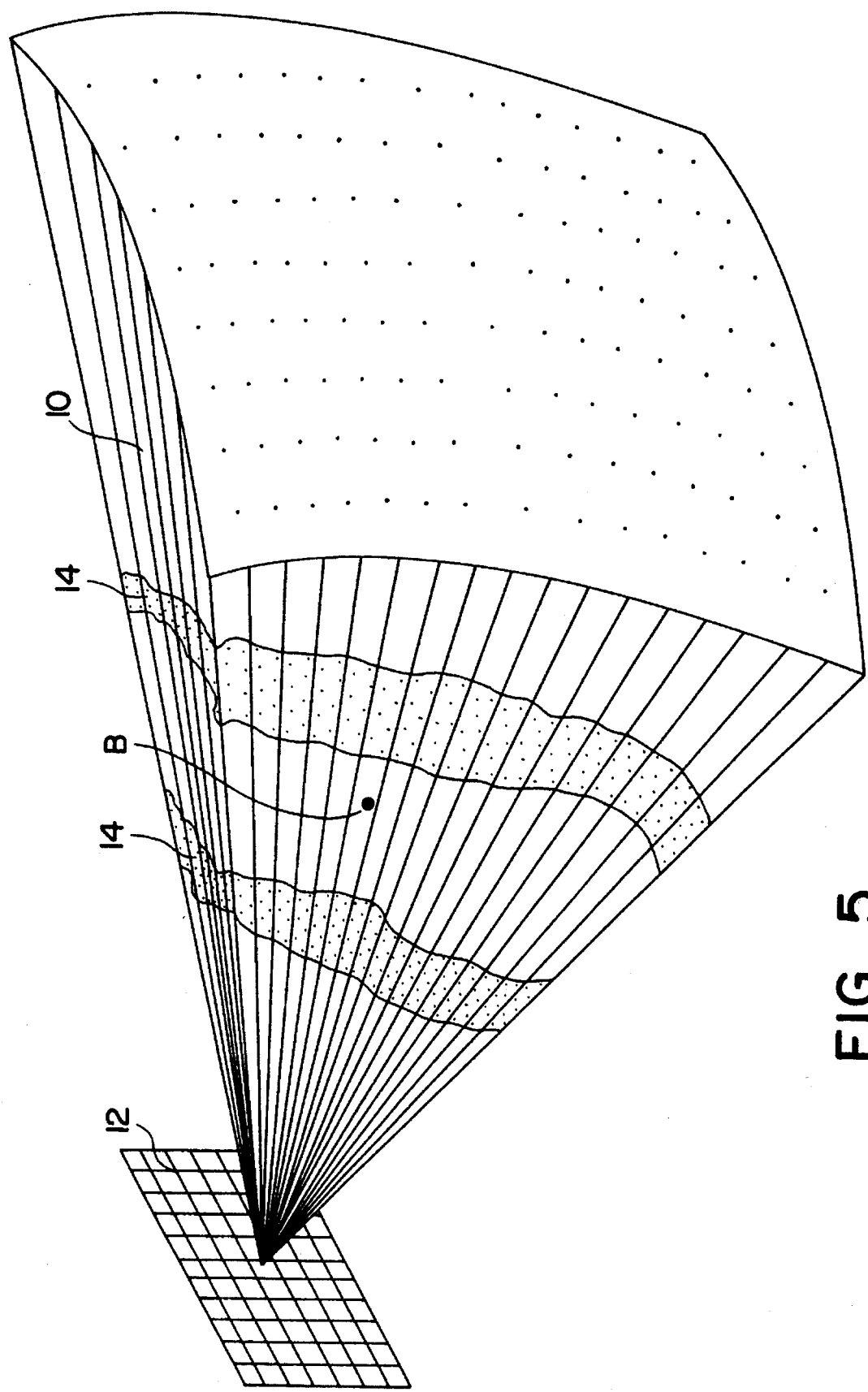
FIG. 5 shows a generalized scan surface.
Figure 7:
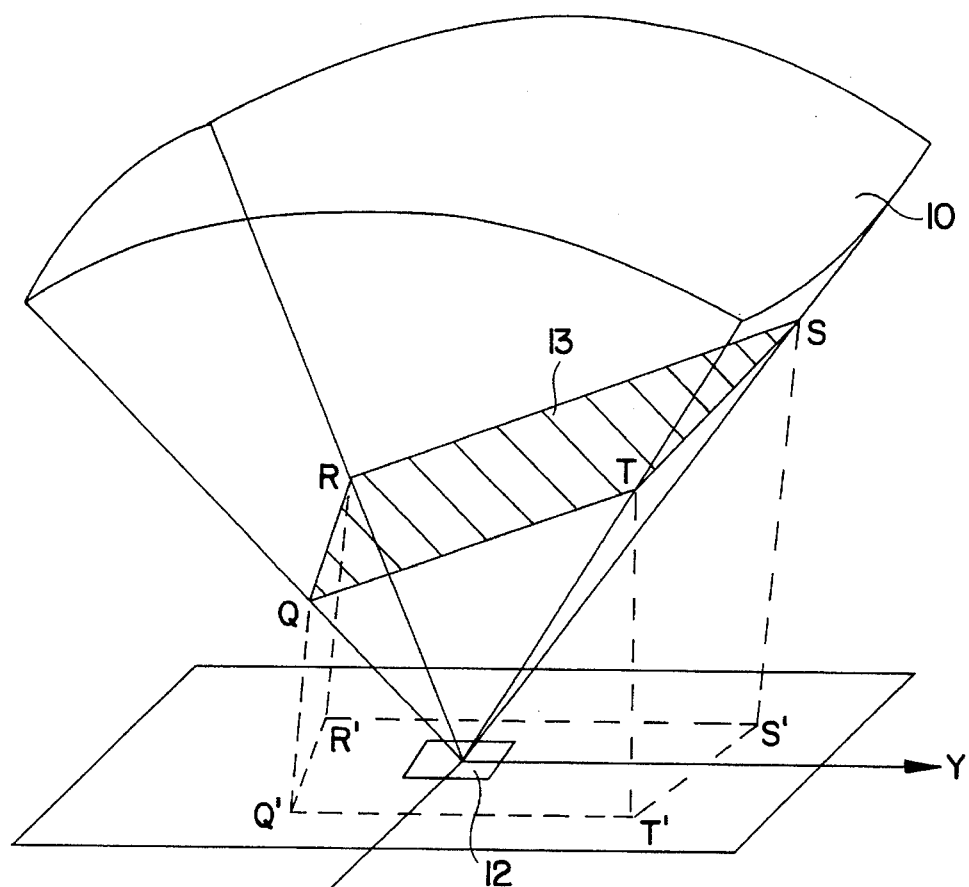
FIG. 7 shows an I slice projection on a hypothetical plane in which the hypothetical plane is in the plane of the transducer array.

FIG. 7 shows the principle of the display projection in which the inclined slice 13 of FIG. 4 is shown with the transducer 12 lying in the hypothetical plane below the pyramidal scan volume 10. In the simplest display implementation, each point in the desired I-scan Q, R S, T is projected back onto the hypothetical plane (which is also the x,y plane in the example of FIG. 7) to form the projected image, Q',R',S',T'.

Figure 8:
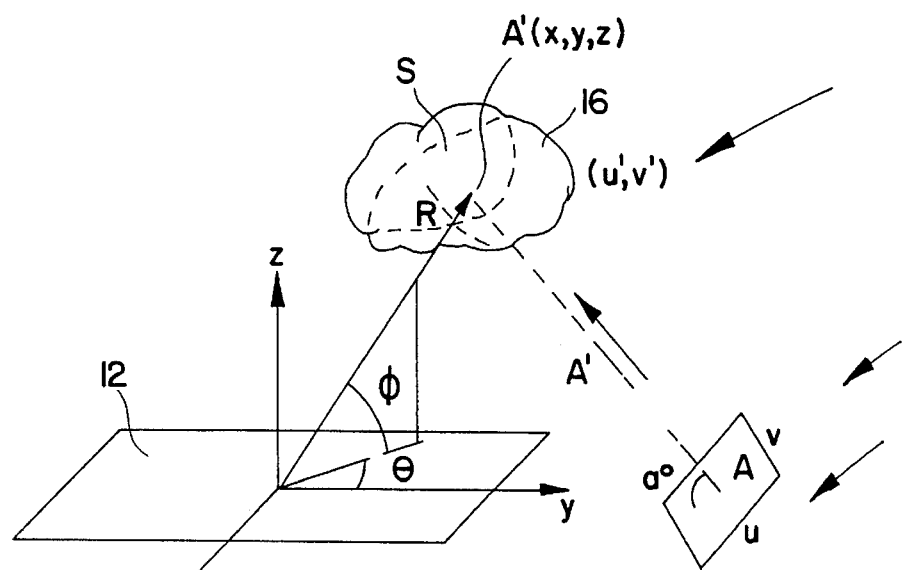
FIG. 8 illustrates the affine projection of a point in object space onto the hypothetical plane.

FIG. 8 illustrates the more general version of the invention incorporating the principle of the general projection commonly known as the "affine" transform and described by Foley et al. FIG. 8 shows a point A' in the object 16 at coordinate position x,y,z, corresponding to polar coordinates R,∅,θ having an origin in the center of the transducer array 12. Location A' is also defined by rectangular coordinates u',v' which lie in the plane of the slice so that u',v' are expressible as functions of R,∅,θ subject to the selection of the slice by the operator. The operator also selects a view direction (see arrow) which thereby define a hypothetical plane containing coordinates u,v which are expressible as functions of u', v' depended upon the selected view direction and are therefore expressible as functions of R,∅,θ. Location A' is projected onto the hypothetical plane. The hypothetical plane, u,v corresponds directly to the display plane. FIG. 8 also illustrates by vector representation that the echo data generated as a reflected intensity from location A' is transposed as brightness to pixel A' on a display plane. The azimuthal angle θ and elevational angle ∅ are defined relative to the x,y plane which is the plane of the transducer (the reference plane). The hypothetical display plane is a mathematical concept introduced in order to visualize the mathematical relationships to be presented. The slice having a boundary S includes a plurality of locations. A' and has an orientation and position selected by the user to intersect the object. The pixels located on the display screen at u,v have a brightness corresponding to the echo data generated at point A' on the scan plane in object space when the array is focused on point A'.

Figure 6:
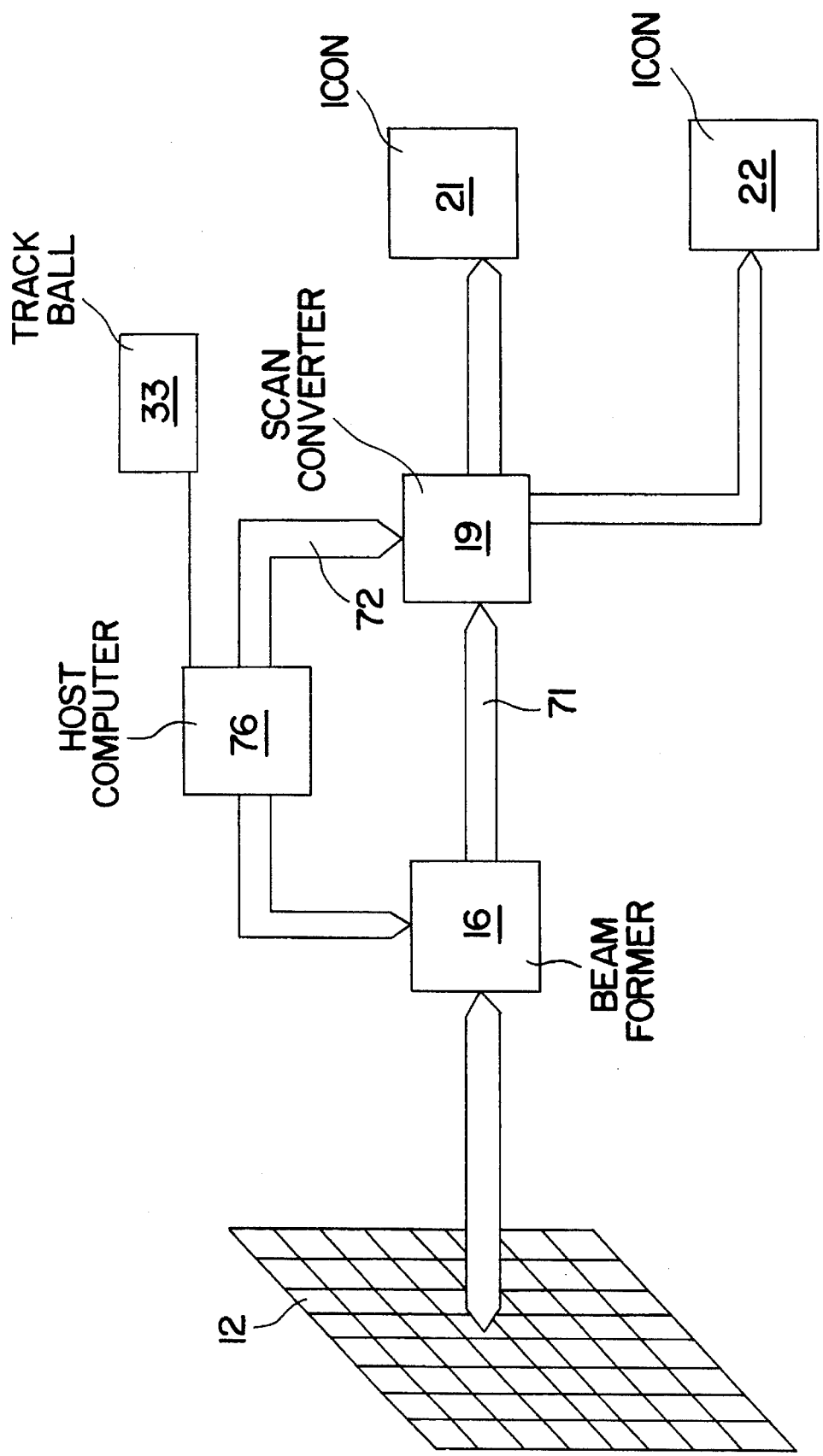
FIG. 6 shows a block diagram of the invention.

The next topic in discussing the embodiments of the invention is the selection by the observer of the slice through the object to be viewed. The slice has a finite thickness. In order to define the the orientation of the slice, we will assume that the thickness is small relative to its distance to the transducer plane. Slice selection is carried out by the operator using a pointer such as the operator controlled select device (not shown) of the host controller 76 of FIG. 6 combined with the pyramidal icon 17 in the display of FIG. 3B. Under interactive software using the light pen or track ball the operator indicates three points on the display screen icon 17 such as points U, V, W, on slice C-1 in FIG. 3B. The three points in the icon 17 correspond to three points in the pyramidal scan volume U=x1, y1, z1
V=x2, y2, z2
W=x3, y3, z3

The three points define the first selected C-plane, i.e., plane C-1 in FIG. 3B. Any selected scan plane is uniquely defined by the three points which are used to find the coefficients of the equation of any selected plane in the object volume. According to the well known principle of three dimensional analytic geometry as exemplified in the text by Chisholm and Morris, solution of the determinant:

$$\begin{vmatrix} x & y & z & 1 \\ x1 & y1 & z1 & 1 \\ x2 & y2 & z2 & 1 \\ x3 & y3 & z3 & 1 \end{vmatrix} = 0$$

yield the general equation of the plane $$ax+by+cz+d=0$$

where a, b, c, and d are constants derived from the determinant by well known mathematical procedures. Analogous procedures are carried out to define the incline scans. It should be noted that, in fact, C-scans parallel to the face of the transducer, the XY plane can be determined by a single constant z=k. In addition, multiple C-scans are then defined by z=k'. The same is true for B-scans perpendicula y=k' and x=k".

An alternate definition of the plane $ax+by+cz+d=0$ also exemplified in the text by Chisolm and Morris is determined by the orientation of the orientation vector <a,b,c,> which is normal to the selected plane which passes through a desired point (xo, yo, zo,) which can be determined by a second vector, i.e., the translation vector.

The result of one implementation of this projection is illustrated in FIG. 3B by the stack of C scan images which undergo shear in the display in accordance with the option of the viewer to view the slice from different view directions.

In the more general implementation, each point in the selected scan is projected orthogonally onto a hypothetical plane at some angle to the slice wherein the slice is an I plane.

Figure 3C:
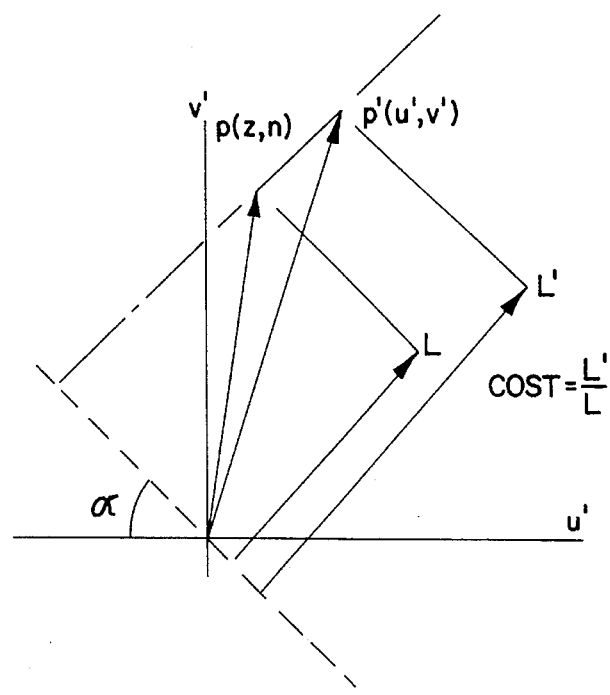
FIG. 3C illustrates the operation of tilting the hypothetical plane (shifting the view direction).

FIG. 3C illustrates the operation of selecting the view direction of locations on the hypothetical plane (and display plane). The operation involves transferring data initially located in addresses of the scan converter memory corresponding to a set of rectangular coordinates, u',v' on the cross section (slice) to new addresses (ξ,η) which are modified according to the operator selected angles γ and α where γ is the angle which the hypothetical plane makes with the slice and α is the angle which the intersection of the hypothetical plane with the slice makes with the u coordinate on the slice.

The operation on the coordinates u,v on the cross section is illustrated in FIG. 3C where location P' is shown initially having coordinates u',v' but because of the change in the perspective direction, P' shifts to P having coordinates ξ,η where $$\xi=u'+(\cos\gamma-1)[u'\sin^2\alpha+v'\sin\alpha\cos\alpha)$$

and $$\eta=v'+(\cos\gamma-1)(u'\sin\alpha\cos\alpha+v'\cos^2\alpha)$$

ξ,η is the new location to where echo data is moved in a buffer memory that was originally stored in address u', v'.

Referring to FIG. 3C, result of the operation is to shrink dimension L' to L.

We now discuss the hardware and steps involved in creating the image (in C scan, B scan or I scan format) of the cross sections selected by the operator. The major parts of the invention are represented in the block diagram of FIG. 6. The beam former 16 (signal processor) receives a "total" electrical signal from the array 12 responsive to the reflected wave from object space. The beam former 16 has an array of delays, A/D convertors and adders which resolve the total signal into sets of intensity signals using techniques described in U.S. Pat. No. 4,694,434 which has been incorporated by reference into this specification. Conditioning of the delays to generate each intensity signal and association of each intensity signal with the correct location is accomplished by input to the beam former 16 from host controller 76. Each intensity signal is the signal generated by a reflected wavelet from a set of wavelets. Each set of reflected wavelets originates from a focal region defined by a single transmit beam intersecting a selected cross section. Each wavelet is a reflection of the transmit beam from one of sixteen focal locations in the focal region. More or fewer than sixteen focal locations are included as possible variations.

Each intensity signal and its location in object space expressed as $R,\theta,\emptyset$ coordinates is digitized by the beam former 16 and presented in real time on bus 71 to a scan convertor 19. Component parts of the scan convertor 19 are shown in FIG. 9. The digitized intensity signal and its coordinates is directed by an I/O controller 24 for storage into either one of scan buffer memories 26A or 26B. I/O controller 24 has a switch which directs incoming data to refresh one buffer memory (26 A or B) while the other buffer memory is being read out for display.

Parameters determined by the selection of the slice and the orientation of the hypothetical display plane (the view direction) are stored in the host controller 76 by the operator using an operator controlled device 33. Coordinates $\xi,\eta$ are stored by the output address generator 28 in buffer register 32. Then output address generator 28 performs an affine transformation on coordinates u'v' which transforms them into "pointer" coordinates r'θ'∅'.

Scan buffer memory 26 A or B is addressed by transform coordinates r'∅'θ' so that the intensity signal in location r',∅',θ' of the scan buffer memory 26A or B is stored in location $\xi,\eta$ of the video buffer memory where it awaits display on the monitor screen.

As discussed below, additional operations may include decimation, resampling (either a filtering process or interpolation depending upon the range. From the frame buffer, an image processing microprocessor, such as the Intel I860, can be programmed to perform image analysis functions. Well-known examples include online and off-line calculations of length, circumference, area and volume using standard algorithms front freeze frame data. The video frame buffer also outputs data to the display monitor.

The following paragraphs discuss the design considerations of the core of the scan conversion of data in real time from $R,\emptyset,\theta$ format to u,v format (rectangular coordinates) with many user selectable (in real time) simultaneous B scans and C scans and I scans. The problem has two parts: storage of data and transformation of the viewing space. In an example implementation, the memory organization for the storage of one pyramidal volume is 4096 lines (in a 64×64) grid with 512 samples per line. In this example, lines of echo data are obtained in 16 simultaneous directions for each transmit acoustic pulse using our previously disclosed 16 to 1 receive mode parallel processing. The 16 lines of envelope detected echo data are digitized in the beam former 16 at a typical rate of approximately 3 mhz or greater and controlled by the Sample Clock and transferred to the I/O Controller 24 of the Scan Converter 19. Echo data from a volume of object space traversed by transmit beams during one scan cycle is stored in the Scan Data Buffer memory in an $R,\theta,\emptyset$ format. This allows data to be written directly from the detected output of the phased array volumetric scanner 16 into a memory without conversion. As a line of the scan is being formed, it is first tagged with its θ and ∅ orientation which determines the 512 sample long column of the 64×64 grid. The line is then digitized and read into the memory with locations in the column corresponding to the range of the data.

A volume of data is transferred to the scan converter 19 via the 16 byte wide, 3 MHz video bus (48MBytes/sec). Sixteen columns of an $R,\theta,\emptyset$ memory with the same organization as the buffer memory are filled simultaneously. This requires a 2M byte memory to be filled in less than 1/30 sec. The Scan Data buffer memory 26 has two such volumetric memories, A and B, as shown in FIG. 9. This allows one memory to be filled in less than one cycle while the data in the other memory is processed. An interlock between the memories prevents a volumetric memory from being operated on while it is being written. One hundred and twenty eight 8×32k static random access memories (SRAM) are used for each of the two volume memories. Each memory location in the Scan Data Buffer Memory 26 A, B is specified by a 32 bit memory address received from the I/O Controller 24. Because of this organization any $R,\emptyset,\theta$ voxel can be addressed in a single cycle.

Two approaches to the affine transformation are possible. The first is to transform the selected planes from the pyramidal volume which are in $R,\emptyset,\theta$ format for the C scans to predetermined u,v, locations on the display as shown in FIG. 8. While this works logically, it is suboptimal from an implementation standpoint because a singe point in data space can map to more than one point in the display space. Resolving this situation in the viewing transformation requires a variable number of calculations which is difficult to pipeline. A better approach is to map the display to the data space. This mapping has the effect of translating the u,v addresses of the display into the $R,\emptyset,\theta$ address spaces of the planes that are selected for view.

Two transformations occur in the Output Address Generator 28 shown in FIG. 9. The first is the general affine transformation which translates the positions of the u,v, display into the x, y, z representation of the volumetric data. Affine transformations are described, for example, by Foley et al. In affine transformations, parallel lines stay parallel and the relative size of objects remains unchanged.

Secondly, since the volumetric data is in reality $R,\emptyset,\theta$ space, a rectangular to polar transformation is further required to transform the u,v representation of the display to the polar coordinates of the volumetric data. The result of the two transformations is that multiple independent views, each of which represents a plane through the volumetric data are created in the display space. The pixels in each of these views have $R,\emptyset,\theta$ address translations.

In the preferred implementation, the scan converter will have several independent views into the volumetric image. By manipulating the icon on the Host Controller, the user can choose he location in the volume from which these windows are getting their data. The entire display is transformed in 1/30 the of a second. Since the user has control over which planes are displayed via icon(which controls the constants in the affine transform) responsive interactive control can be maintained.

By scanning out the display space (pixels of which now contain the R,∅,θ address translations of the appropriate data in planes of the volume) in raster format, the image planes that belong in the various independent viewa that have been created can be accessed at a rate of one voxel per cycle so that one pixel per cycle of the display can be sent to the monitor.

The scan converter shown in FIG. 9 naturally falls into two parts based on clocking and minimum interconnect: a Scan Buffer Memory and an I/O Subsystem. The I/O Subsystem includes four modules: the I/O Controller 24, the Output Address Generator 28, the Video Frame Buffer 30A, the Display Output 34. the Scan Data Buffer 26 has no connection to the rest of the 3D Ultrasound machine except for power. It is completely synchronous with a single Scan Converter clock. The I/O Controller 24 reads and writes the Input Volume, while the Output Address Generator 28 reads the Output Volume. The I/O Controller 24 connects to the beamformer bus 71 to synchronize the ultrasound data to the scan converter clock. It also connects to the bus 72 from the Host Controller 76, the I/O controller 24 writes the ultrasound data to the Input Volume in the Scan Buffer 26 A, B.

As shown in FIG. 9, inputs 38 to the I/O Controller 24 from the Beam Former include sixteen 8 bit busses (16 bytes) to transfer the digitized ultrasound echo data through the I/O Controller to the Scan Data Buffer memory. Other inputs to the I/O Controller include (a) the Sample Clock 40 from the Beam Former 16 which may operate at a frequency up to 25 MHz. (b) the Display Time Flip Flop[(DTFF) 42 which is enabled in the Beam Former 16 during reception of the echo data to the transducer and indicates to the Scan Converter what valid data exists on the Beam Former data bus. The Scan Converter asserts Scan Converter Busy to signal the Beam Former 16 that it has not completed converting the previous frame and therefore cannot swap the current frame buffer. This means that the beam former must not start any new lines until the scan converter negates the Scan Converter Busy 44 which signals the Scan Converter has completed converting the previous frame and has started convening the current frame. This means that the Beam Former 16 is now free to continue transmitting.

FIG. 9 also shows the connections from the Host Controller 76. The Scan Converter 19 will be a 32 bit slave module to the Host Controller. The Scan Converter 19 requires an address to identify which rays are being imaged, since the beam former 16 may not form the image sequentially. For the example implementation of 64×64=4096 echo data lines, if one does not count the 16 to 1 parallel receive mode processing, there are 16 possible sample locations each in the ∅ and θ directions, therefore eight address bits are required for the C-scan mode. The scan converter I/O control 24 will include this 16 bit register, Scan Data Address 45 which includes the address bits. This register will be double-buffered. The scan converter 19 will read the buffer at the beginning of each ray and the Host Controller 76 has from the beginning of that array until the beginning of the next ray to write the new address. The I/O Control 24 also receives from the Host Controller 76 location and spacings on the display screen of each desired window, i.e., uo, vo, u, v, w. The scan converter 19 will generate two interrupts: the vertical blanking interval 68 and Start Conversion 70.

FIG. 10 is an expanded view showing connections to the Scan Data Buffer Memory 26 A, B with its I/O and Control signals from I/O Control 24 and Output Address Generator 28. The I/O Controller 24 may send three address values and two control signals to the Scan Data Buffer 26 A, B every clock cycle. A bidirectional; 26 byte data bus connects the I/O Controller 24 and the Scan Data Buffer Memory 26. Sixteen 8 bit ultrasound samples on input 86 corresponding to 16:1 parallel processing may be written to the Scan Data Buffer Memory 26 A, B or read from the Scan Data Buffer 26 A, B every clock cycle, with some constraints. The sixteen samples have the same Radius Address and ∅ addresses 0.1,2,3 and have θ address=0,1,2,and 3.

Radius Address 80:

Radius is a 9-bit register, selecting 1 out of 512 possible values of ∅ address for the C-scan or I-scan data format.

The ∅ Address 84:

∅ is a 6 bit integer selecting 1 out of 64 possible values for the C-scan or I-scan data format.

Select input volume A, line 88:

The I/O Controller 24 asserts this signal when vol A is the Input volume. This signal signifies that the I/0 Controller 24 will read or write Volume A., while the Output Address Generator will read Volume B. The I/O Controller 24 negates this signal for the opposite case.

Write Enable 90:

The I/O Controller 24 asserts this signal; 11 for a single clock cycle for each 32-bit data sample to be written.

Read Enable 92:

The I/O Comntroller asserts this signal to read the d 4-data samples addressed by R,∅,θ. The I/O Controller shall never assert both Write Enable and Read Enable in the same clock cycle.

IOData Bus 86:

The bidirectional IOData Bus contains 16 each 8-bit data samples.

Scan Converter Clock 94:

The I/O Controller provides the Scan Converter Clock which is nominally 25 mhz. The Output Address Generator (OAG) 28 sends 4 values to the Scan Data Buffer Memory every clock cycle to select output phases.

OAG RADIUS 96:Radius is a 9 bit two's complement integer. There are up to 512 samples in a line or 9 bits.

Max Radius 98:

MaxRadius is a 9-bit integer. It is the largest radius address that holds valid data. The Scan Data subsystem clips radius data greater than MaxRadius.

OAG ∅: 100

OAG θ 102:

For C-scan data, both ∅ and θ are 9-bit 2's complement values.

(64 lines/60)*360=384 lines

Therefore, 9 bits of integer are required to capture all possible angles. ∅ and θ must be two's complements numbers.

Figure 11:
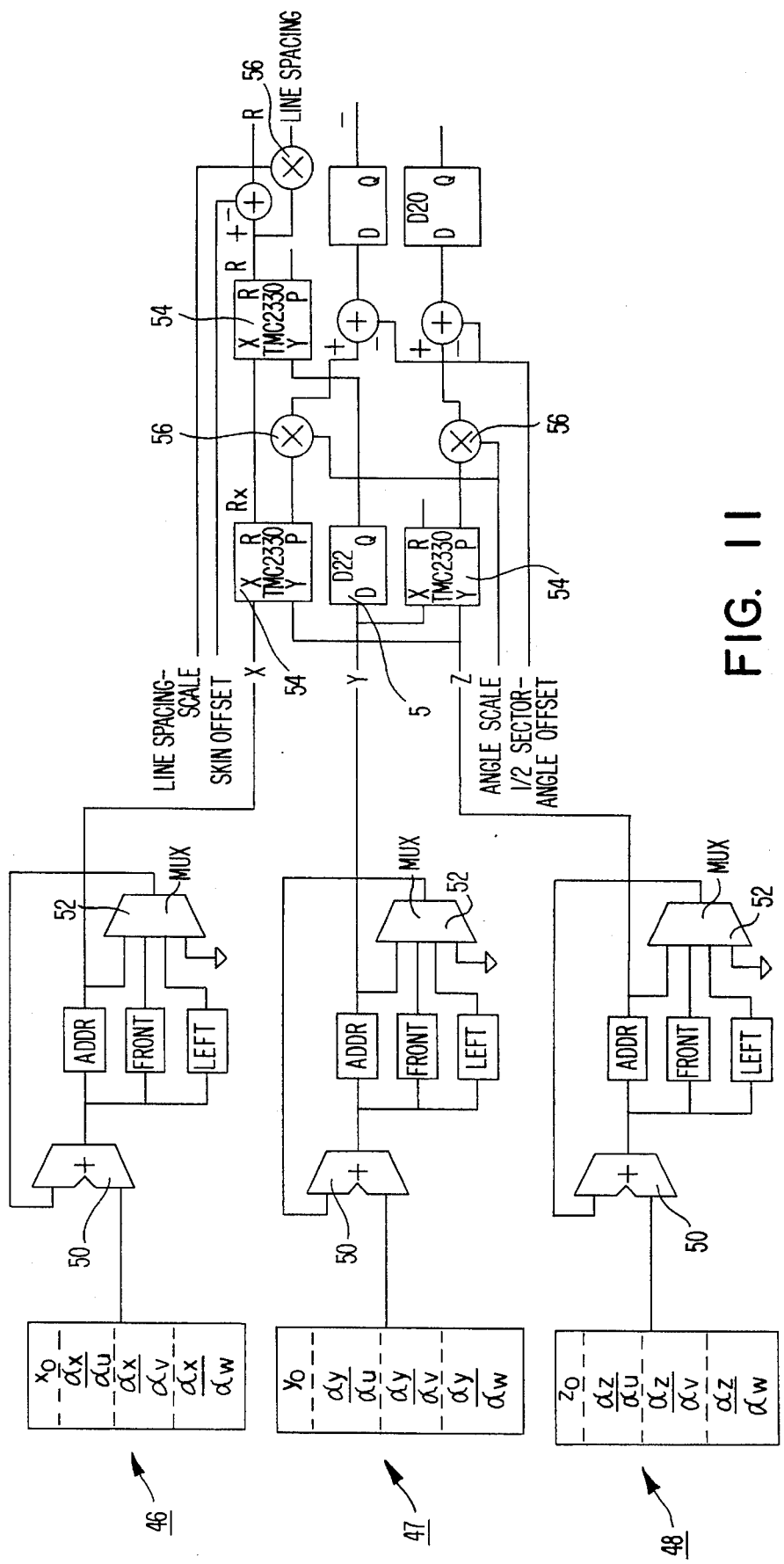
FIG. 11 shows the affine transform blocks of the affine transform generator.

These address of the video output data are generated in the Output Address Generator 28 by means of the affine transform followed by rectangular to polar coordinate transform as shown in FIGS. 11 and 9. These transforms constitute the mapping of display space into object space. FIG. 9 shows the OAG buffer register 32 which receives from the Host Controller 32 the coordinates of the C-scans, I-scans or B-scans selected by the user via the icon. The data correspond to the translation and orientation vector of the selected plane as described above. For each selected image plane through the pyramidal volume, the Host Controller 76 transfers the following data words to the Scan Converter 19.

(a) xo,yo,zo which locate the center of the selected plane in the pyramidal object (b) the partial derivatives $$\frac{\partial x}{\partial u} \quad \frac{\partial y}{\partial u} \quad \frac{\partial z}{\partial u} \quad \frac{\partial x}{\partial v} \quad \frac{\partial y}{\partial v} \quad \frac{\partial z}{\partial v} \quad \frac{\partial x}{\partial w} \quad \frac{\partial y}{\partial w} \quad \frac{\partial z}{\partial w}$$

X which determine the tilt or orientation of the selected plane in object space.

These twelve words form the input to the affine transform blocks of the OAG shown in FIG. 11.

(c) uo, vo which locate the corner of the chosen window in the display.

(d) u,v, w which determines the incremental step in display space.

These five words are transferred to the I/O Controller 24 from the Host Controller 76

As shown in FIG. 11, there are three parallel paths 46, 47, 48 through the affine transform block in the OAG. For example, in the top path, the origin of the selected plane from the display icon, xo is combined in the digital accumulator 50 with the derivatives dx/du, dx/dv, dx/dw which determine the orientation vector or tilt of the selected plane. The output of the digital accumulator 50 passes to the multiplexer 52 (MUX) in FIG. 11 to determine the FRONT and LEFT edges of the selected plane. The output of the MUX 52 produces each coordinate in object space for the selected plane. Analogous operations occur in the parallel paths for coordinates and respective derivatives for y and z. The outputs from the three multiplexers (now x, y, z) in object space pass to the three inputs of the rectangular to polar coordinate transformer 54 which can use then well known commercially available chips TMC2330. The rectangular to polar transform also includes inputs for line spacing, near field blanking and angular scaling. Shift register D20 and D22 introduce necessary timing delays of 20 and 22 clock cycles respectively. The TMC2330 rectangular to polar transformer has a 22 clock cycle delay. Two of these parts in series generate the Output Radius value for a total of 44 clock cycles. A commercially available LMU 18 16×16 multiplier 56 multiplies the output Radius by the Line Spacing Factor to calculate the Line Spacing output. Two LMU 18s 56 multiply the ∅ and θ Outputs from their respective TMC 2330s by the Angle Spacing Factor from the Radius to get OAG Radius. This completes the generation of output addresses in object space which are used by the Scan Data Buffer to pass the echo data to the Video Output Buffer.

The Scan Converter 19 has two video outputs; a 60 fps,640×480 RGB display and a 30 fps composite NTSC version of the same data. The NTSC signal is derived from the 60 fps display by the alternately displaying the odd and even fields of each display frame for the interlaced NTSC signal which is 60 interlaced field/sec and only 30 fps. The host sets a parameter to signal the Scan Converter that a new set of display parameters has been loaded. Before converting each new frame of scan data, the scan converter tests the parameter metaphor. If it is set, the Scan Converter clears the parameter metaphors and the host has until the end of this frame to write a new set of display parameters, which will take effect on the next frame.

The following memory spaces must be allocated:

1 Kbyte scan converter control.

These are the control register which select the scan format, control the location, extent and viewport, enable/disable M-mode, etc. They are read/write registers for diagnostic purposes.

2 Mbytes scan data buffer.

There is actually twice this much memory in the scan converter 19. One buffer 26 A is read by the output address register generator 28 while the other buffer 26 B is written by the I/O Controller 24. The host controller 14 will only be able to access the input buffer through the input controller.

½ Mbyte Video output frame buffer memory 30 A, B

This is the output buffer into which the scan converter 19 writes the images. The video buffer 30 is monochrome; each byte is an unsigned 8-bit magnitude. There is actually twice as much memory in the Video Frame buffer 30,½ Mbyte which the scan converter 19 and ½ Mbyte which is displayed. These physical memories are swapped when the scan converter 19 completes one frame of display. The video frame buffers, 30 A, B are implemented with 256k×8 (2 Mbit) video RAMs. the scan converter 19 writes into the random access port of the write buffer and the serial access port is read to the display. The host controller 76 will only be able to access the ½ Mbyte output buffer by reading or writing its random access port. The C-scan or B-scan ultrasound images are written into a double-buffered frame buffer. One buffer is being displayed while the other is being written, then they are swapped so that the new images are over written.

Alternate Implementation

Pixels in the ξ η display space do not have a one to one mapping with voxels in the R,∅,θ space which causes two problems with a simple readout in raster format of the transformed display space as discussed above. The first problem is that near the apex of the pyramid, multiple R,∅,θ points from the 4096 line scan have the same address in the u,v space., more than one volumetric image point is mapped it the output display point. the second problem is that, near the periphery of the scan, only one volumetric data point is available per six display pixels.

To solve this mapping problem, the data in the volumetric image space may be resampled or interpolated in an alternate implementation before it is displayed. Thus, when the display space is being written in raster format, each point from the image space that is acquired could be replaced by a set of 4×4×4 of the nearest neighbors to the voxel. This set of 4×4×4 voxels is used to calculate the best value for the pixel in display space. For points not near the apex of the scan, a three dimensional separable cubic convolution kernel can interpolate the missing points. This method has been described in the literature as exemplified by Parker et al. This method preserves edges and peak amplitudes to perform the filtering and bicubic estimation. Approximately 147 adds and subtracts are done in a 25 MHz cycle per pixel to implement the resampling. The interpolation filter is accomplished using for example) twenty one LF2246 Digital Finite Impulse Response Filter Chips. Sixteen filters are used in range detection,4 in the elevation (∅) direction and one in the azimuthal (θ) direction to complete the interpolation.

Figure 12:
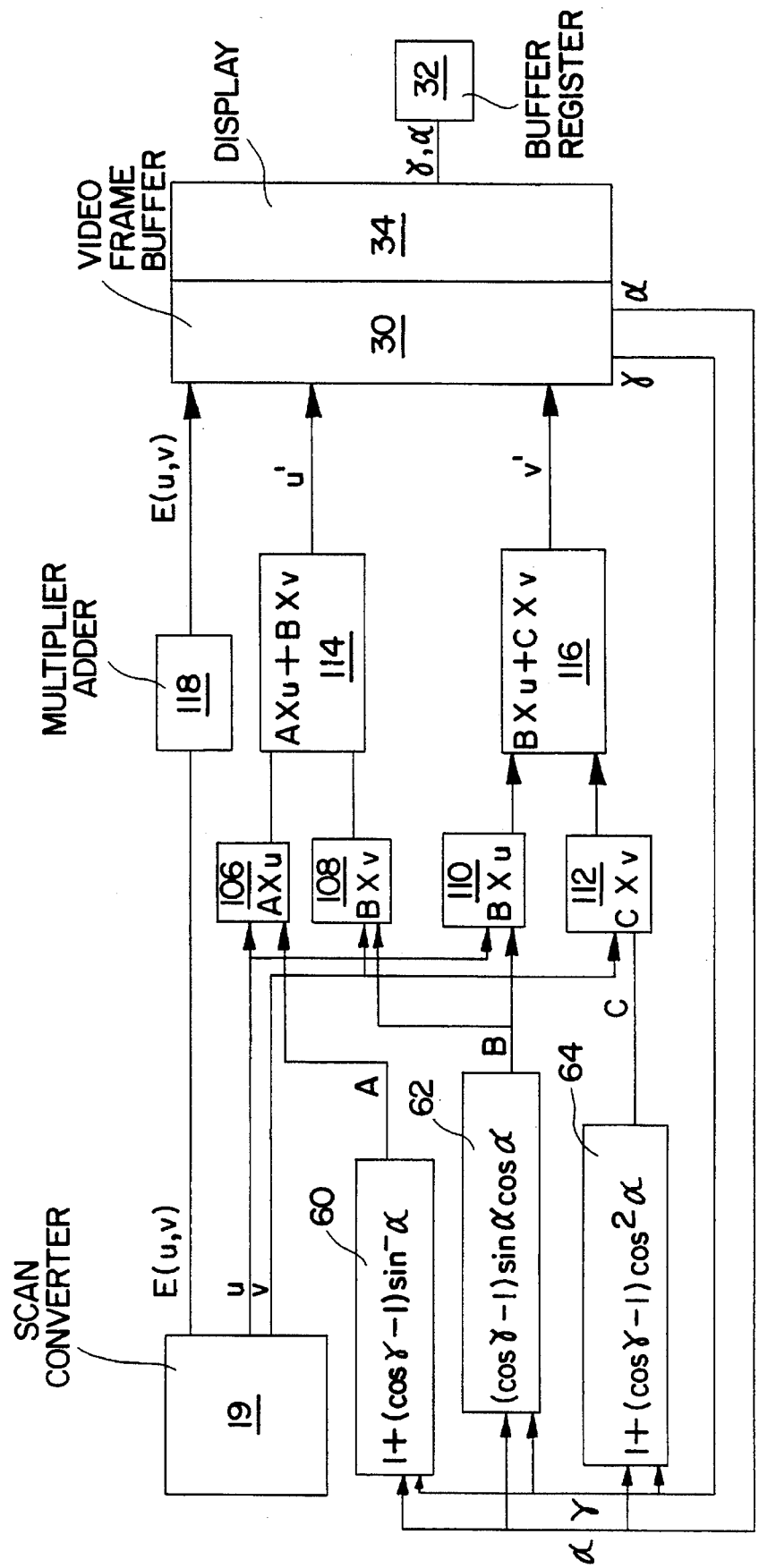
FIG. 12 shows a schematic for selecting the view direction.

FIG. 12 shows a flow diagram for assigning new values,ξ η to display coordinates u,v such as to shear the image in order to present an impression of three dimensions to the viewer as shown in FIG. 3B. The mathematics of the conversion was discussed above in connection with FIG. 3C. Scan converter 19 outputs a stream of echo data E(u', v') and coordinates u',v'. Track ball interacting with display screen 34 and display buffer memory 30 generate angles α and γ according to the tilt and orientation of the view direction selected by the viewer. These parameters are used to compute A, B, C from adder/multiplier circuits 60, 62, 64 respectively where $$A = 1 + (\cos\gamma - 1)\sin^2\alpha$$

$$B = (\cos\gamma - 1)\cos\alpha\sin\alpha$$

$C=1+(\cos\gamma-1)\cos^2\alpha$

A, B, C are combined with coordinates u',v' in multiplier/adders 114 and 116 to produce modified coordinates $\xi,\eta$ respectively, where:

$\xi=Au'+Bv'$ $\eta=Bu'+Cv'$

Echo data, E(u',v') and coordinates $\xi,\eta$ are input to the display buffer memory 30 for display on screen 34.

The above description presents embodiments of the invention which we presently believe are preferred for carrying out the invention. Other embodiments and variations may be considered after studying the drawings and specification which are within the scope of the invention. We therefore wish the scope of our invention to be defined by the appended claims.

What is claimed is:

1. An apparatus for simultaneously displaying in real time, an image of at least one section of variable thickness of a three dimensional object having a range of acoustical properties, said at least one cross section being any cross section of said object and selected by a viewer viewing said displayed image, said apparatus comprising:

means adapted for radiating said object with a plurality of sonic beams such that each beam of said plurality of sonic beams generates a wave reflected from a plurality of locations distributed in all regions of said object;

means for resolving said wave into a plurality of echo data, each echo datum of said plurality of echo data representing intensity of reflection of one of said plurality of sonic beams from one of said plurality of locations in said object respectively;

scan converter means for storing each said datum at one of a plurality of addresses in a memory of said scan converter means, each one of said plurality of addresses corresponding to one of said plurality of locations in said object respectively;

means for displaying said image of said at least one section including a screen with a plurality of display locations and terminal means for receiving a plurality of signals and displaying each signal as brightness at a respective one of said plurality of display locations corresponding to said image;

buffer memory means for storing each said echo datum from said scan converter memory then transferring each said echo datum so as to apply a series of said plurality of signals to said terminal means of said display means;

said buffer memory means having buffer memory addresses, each buffer memory address corresponding to one of said display locations respectively;

means operated by said viewer for selecting a set of addresses in said scan converter memory of said scan converter corresponding to said at least one section in said object selected by said viewer;

an address pointer means for matching each buffer memory address to a memory address in said memory of said scan converter means belonging to said set of memory addresses in said scan converter memory and transferring to each said buffer memory address said datum stored in said memory address of said scan converter memory respectively;

means for providing data stored in said buffer memory address to said terminal means of said display means.

2. An apparatus as in claim 1 wherein said means for radiating includes;

means for irradiating an entire volume of said object by emitting said plurality of beams in a repeated pattern of directions.

3. An apparatus as in claim 2 wherein said radiating means includes means for generating said plurality of beams as groups of beams, each beam in each group having an azimuthal angle advanced over a next previous beam in said each group such that each group produces a B scan having an elevational angle that is advanced over an elevational angle of a next previous B scan such as to produce a volumetric scan.

4. An apparatus as in claim 1 wherein said image has a format selected from a group of formats which consists of I-scans, C-scans and B-scans.

5. An apparatus as in claim 1 which comprises:

means for reassigning each said datum in each one of of buffer memory addresses to a different buffer memory address such that said image is compressed in a view direction thereby displaying an image of a view of each one of said cross section in said view direction;

means for enabling said viewer to select said view direction.

6. An apparatus as in claim 5 wherein each one of said set of buffer memory addresses corresponds to a pair of rectangular coordinates u,v on the selected cross section and said view direction is definable by an elevational angle, $\emptyset$, which is the angle which the view direction makes with the selected cross section and an azimuthal angle, $\theta$, which is an angle between the projection of the view direction on the selected cross section and the rectangular coordinate, u, said apparatus comprising;

means for calculating an address corresponding to coordinates u',v' where $\xi=u+(\cos\gamma-1)[u\sin^2\alpha+v\sin\alpha(\cos\alpha]$ and $\eta=v+(\cos\gamma-1)[u\sin\alpha\cos\alpha+v\cos^2\alpha]$ means for inputting values of $\gamma$ and $\alpha$ into said means for calculating $\cos\gamma$, $\cos\alpha$ and $\sin\alpha$, wherein $\alpha$, and $\gamma$ are selected by said viewer;

means for transferring datum stored at each said different buffer memory address corresponding to coordinates u,v to a new buffer memory address corresponding to $\xi,\eta$.

7. An apparatus as in claim 6 wherein said means for inputting said values of and comprises;

a device selected from the group of devices that consists of a mouse, a light pen, a track ball;

an area of said display means being a circle wherein locations in said circle correspond to values of $\gamma$ and $\alpha$ such that when one of said locations is activated by said viewer operating said device, corresponding values of $\gamma$ and $\alpha$ are inputted to said means for calculating respective values of $\xi$ and $\eta$.

8. An apparatus as in claim 5 wherein said at least one cross section is a fourth plurality of cross sections including a group of cross sections all parallel to one another.

9. An apparatus as in claim 8 wherein said means for displaying has means for displaying cross sections belonging to said group on said screen in perspective with one another such that said viewer can view dynamic relationships between locations on separate cross sections of said group of cross sections.

10. An apparatus as in claim 1 wherein said means for radiating includes:

array means having a radiating surface for radiating said sonic pulsed beam from said radiating surface in any one direction of said first plurality of transmit directions, each transmit direction definable by azimuthal and elevational angular coordinates means for successively pulsing said array means to emit said first plurality of transmitted beams;

means for controlling each said transmit direction to lie in a repeated pattern of transmit directions such as to intersect said object.

11. An apparatus as in claim 10 wherein said array means comprises:

an array of piezoelectric transducers having two parallel faces, a first face and a second face forming a radiating surface and two electrical terminals, one terminal to one face respectively;

said transducers arranged to form at least one column of transducers perpendicular to at least one row of transducers.

12. An apparatus as in claim 10 wherein said means for resolving comprises:

means for conditioning said array means to receive said reflected wave after transmitting said transmit beam;

a fifth plurality of means for forming a sum thereby forming a fifth plurality of sums, each sum being the sum of signals, each signal generated by reflected wave received at one of said transducers respectively;

each said means for forming each one of said fifth plurality of sums constructed to displace a phase of each said signal in said sum such that each sum is one of said echo data.

13. An apparatus as in claim 1 wherein said memory of said scan converter means comprises:

two scan converter buffer memories; each said scan converter buffer memory having at least said second plurality of addresses an input-output controller constructed in operable combination with said means for resolving and said two scan converter buffer memories to enable alternately refreshing one of said two scan buffer memories with most recent echo data while writing echo data to said display means from said other scan converter buffer memory.

14. An apparatus as in claim 1 wherein said means for selecting said at least one cross section comprises:

a device selected from the group of devices that consists of a mouse, a light pen, a track ball;

said means for displaying having a set of icon locations on said screen and being constructed in operable combination with said device such that activating three icon locations with said device sends to said address pointer a signal that conditions said address pointer means to match each one of said third buffer memory addresses with one of said set of scan memory addresses corresponding to one of said second locations in said selected cross sections.

15. An apparatus as in claim 14 wherein said set of icon locations is arranged as a pyramidal icon displayed on said screen.

16. An apparatus as in claim 1 wherein said means for displaying has a display memory with a third plurality of addresses connected with input terminals and output terminals connected to said screen.

17. An apparatus as in claim 16 wherein said address pointer means comprises means for performing affine transforms.

18. An apparatus as in claim 17 wherein said means for performing affine transforms comprises:

accumulator means for combining origin data entered from said means for selecting with the derivatives representing tilt of the selected cross section to produce an output signal;

multiplexer means for determining rectangular coordinates corresponding to edges of said selected cross section from said output signal;

means for transforming said rectangular coordinates to polar coordinates such as to generate the output addresses corresponding to locations in object space;

means in operable combination with said means for transforming for passing echo data from addresses in said scan converter memory corresponding to said output addresses to said buffer memory of said display means.

19. An apparatus as in claim 1 wherein at least one location of said second plurality of locations in said object is separated from neighboring locations in said object by a distance that is greater than a distance in object space corresponding to two neighboring display locations and said means for resolving comprises means for calculating a hypothetical value of echo datum which is an interpolated value of echo datum computed from echo datum from said at least one location in object space and a neighboring location in object space.

20. An apparatus as in claim 1 wherein at least one location of said second plurality of locations in said object is separated from its neighboring locations in said object by a distance that is smaller than a distance in object space corresponding to two neighboring display locations and said means for resolving said total wave comprises means for calculating a hypothetical value of echo data which is an average value of echo data computed from echo data from said at least one location in object space and at least one neighboring location in object space.

21. A method for simultaneously displaying in real time, an image of at least one cross section of a three dimensional object having a range of acoustical properties, said at least one cross section being any cross section of said object and selected by a viewer viewing said displayed image, said method including the steps:

(a) radiating said object with a plurality of sonic beams such that one of each said beam generates a total wave reflected from locations in all regions of said object;

(b) resolving said total wave into echo data, each said datum of said echo data representing intensity of reflection of said sonic beam from one of a second plurality of locations in said object respectively;

(c) storing each said datum at one of said second plurality of memory addresses in a scan converter memory, each one of said first plurality of memory addresses corresponding to one of said first plurality of locations in said object respectively;

(d) selecting a set of addresses in said scan converter memory corresponding to said at least one cross section in said object selected by said viewer;

(e) matching buffer memory addresses of a buffer memory to said set of memory address in said scan converter memory;

(f) transferring to each said buffer memory address said datum stored in said scan converter memory address respectively;

(g) sending echo data from said buffer memory to a means for displaying said echo data as brightness on a display screen wherein said coordinates on said display screen correspond to addresses in said buffer memory.

22. A method as in claim 21 which includes after step (e) the steps:

selecting a view direction for viewing said cross section;

reassigning each said datum in each one of a set of memory addresses to a different memory address corresponding to compressing said image in a direction on said display screen such as to display an image of a view of each one of said cross section as seen from said perspective direction.

23. An apparatus for simultaneously displaying in real time, an image of at least one cross section of a three dimensional object having a range of acoustical properties, said at least one cross section being any cross section of said object selected by a viewer, said apparatus comprising:

means for producing a first plurality of echo data from a plurality of locations, one datum of said plurality of data from one of said first plurality of locations respectively, said plurality of locations being distributed throughout an entire volume occupied by said object;

a memory means having a first plurality of memory addresses for storing each said datum in one of said first plurality of memory addresses respectively, said memory means operably coupled to said means for producing;

means for selecting a second plurality of memory addresses from said first plurality of memory addresses, said second plurality of memory addresses having one to one correspondence with a second plurality of locations selected from said first plurality of locations and lying on said at least one cross section;

means for displaying said echo data stored in said second addresses as brightness levels on a screen with positions on said screen mapped one to one to locations in said second plurality of locations such that said image of said at least one cross section is displayed on said screen.

24. An apparatus as in claim 23 wherein said means adapted for displaying includes means for compressing dimensions of said image of said at least one cross section along a direction selected by said viewer such that said image appears tilted to said viewer.

25. An apparatus as in claim 24 wherein said at least one cross section is more than one cross section thereby being a third plurality of cross sections and images of each said cross section are arranged in perspective with one another.

* * * * *